Figure 1:
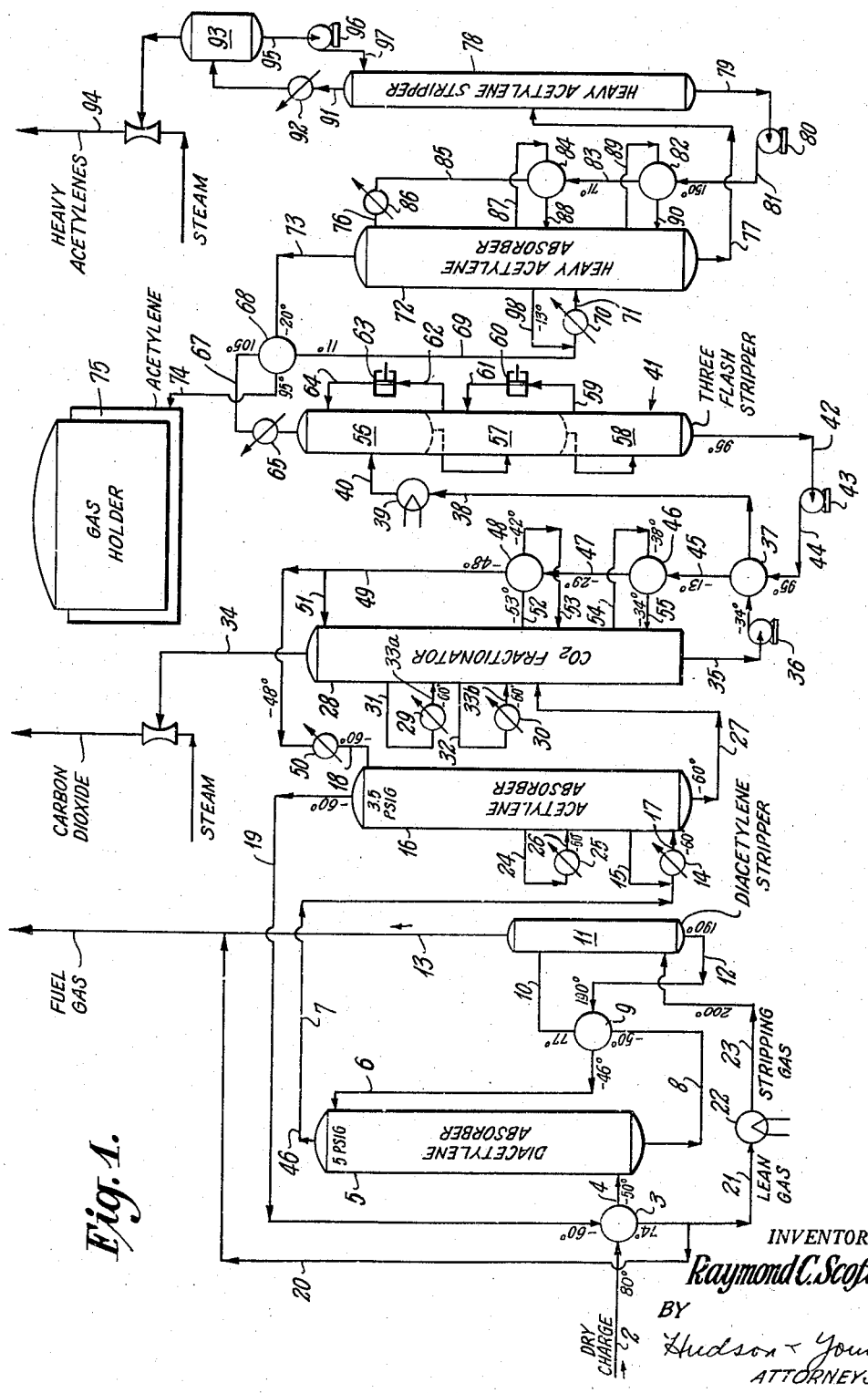

Aug. 18, 1959    R. C. SCOFIELD    2,900,044
RECOVERY AND PURIFICATION OF ACETYLENE
Filed July 7, 1954      2 Sheets-Sheet 2

INVENTOR.
Raymond C. Scofield
BY
Hudson & Young
ATTORNEYS

United States Patent Office 2,900,044
Patented Aug. 18, 1959

2,900,044

RECOVERY AND PURIFICATION OF ACETYLENE

Raymond C. Scofield, near Bartlesville, Okla., assignor to Phillips Petroleum Company, a corporation of Delaware Application July 7, 1954, Serial No. 441,809

15 Claims. (Cl. 183—115)

This invention relates to the recovery of acetylenes from gases containing the same. In one of its aspects, the invention relates to the recovery of acetylene from gases containing the same by contacting the said gases at temperatures below 0° F. with dimethylformamide. In another aspect of the invention, it relates to a modus operandi, more fully described hereinafter, in which certain advantageous sequence of steps permitting advantageous utilization of refrigeration capacity is employed, the said steps involving the removal from said gas containing acetylenes of diacetylene by contact with dimethylformamide or another solvent followed by the removal of the acetylenes from said gas, the removal of carbon dioxide from the acetylenes and the recovery of the acetylenes by a flashing operation and the separation of the acetylenes into acetylene per se and heavier acetylenes as more fully described below. In still another modus operandi, there is employed an advantageous sequence of steps, permitting efficient utilization and savings in energy requirements, the said steps involving the removal from said gas-containing acetylenes of all of the said acetylenes and carbon dioxide, removing carbon dioxide from the rich solvent by fractionation at low pressure, then flashing off from the rich solvent acetylene and heavy acetylenes, leaving the diacetylene in the solvent, then separating the acetylene from heavy acetylenes, and then recovering the diacetylene from the solvent, as more fully described below. In still another aspect of the invention, it relates to the pre-mixing with acetylene containing gas on its way to an acetylene absorber of rich solvent stream taken from said absorber and cooling the admixture thus formed and then passing it into said adsorber, also as more fully described below. Other aspects and advantages are apparent from this disclosure, the drawings and the claims.

It is known that the recovery and purification of acetylene can be effected by first compressing the acetylene containing charge to about 150 pounds per square inch gage and then absorbing the acetylene in selective solvents at temperatures above 0° F., i.e., at ordinary temperatures. By means of this invention, acetylene may be absorbed at temperatures of from —20 to —70° F., substantially without compression, at pressures near atmospheric and preferably at not over 15 pounds per square inch gage. It is normally desirable to operate the absorption step at as low a pressure as permits plant utilization of the off-gas as fuel. This invention provides substantial and simultaneous reductions in net refrigeration, compression horsepower, exchanger surface, and solvent rates.

The unexpected influence of low temperatures, according to the present invention, is directly evident on the activity coefficients of acetylene. Comparative activity coefficient data for conventional and low temperature absorption in dimethylformamide, according to the present invention, are as follows:

Table 1

| Mol Percent Acetylene | Activity Coefficients | |
|---|---|---|
| | 122° F. | —66° F. |
| 0 | .50 | .045 |
| 5 | .52 | .056 |
| 10 | .55 | .070 |

Relatively much greater advantage is obtained than is indicated above since the temperature level also affects the fugacity or vapor pressure of acetylene to roughly the same degree. The equilibrium constant for acetylene depends upon the product of the activity coefficient and fugacity and, therefore, shows a much more drastic change with temperature than does the activity coefficient alone. Thus, in the above, at a pressure of 14.7 pounds per square inch absolute, the equilibrium constants have a ratio 100 to 1 for zero percent acetylene and about 70 to 1 for 10 percent acetylene.

According to this invention, there is provided a process for the recovery and purification of acetylene, or acetylenes, from a gaseous stream containing the same in admixture with other gases which comprises contacting said stream with a solvent, for example, dimethylformamide, at a temperature below 0° F., preferably below about —20° F., and still more preferably in the range —20 to —70° F. At said relatively low temperatures the invention is of especial interest when applied to gas streams which are very low in acetylene content.

Still further according to this invention, there is provided a modus operandi comprising the steps as follows; contacting a gas containing acetylenes, carbon dioxide and other gases with dimethylformamide or other suitable solvent to remove diacetylene therefrom, contacting the resulting gases with dimethylformamide or other solvent to remove acetylenes therefrom, and removing carbon dioxide from said acetylenes and then recovering said acetylenes from said solvent.

Also, according to the invention, there is provided another modus operandi comprising the steps as follows; contacting a gas containing acetylene, heavy acetylenes, diacetylene, and carbon dioxide with dimethylformamide or other suitable solvent to remove therefrom the acetylenes and carbon dioxide, removing carbon dioxide from the rich solvent thus obtained, then removing the acetylenes from said solvent, separating acetylene from said acetylenes, say by adsorption of the heavy acetylenes in toluene, and finally recovering diacetylene from said solvent.

Further, according to the invention, in the recovery of an acetylene from a gas containing the same by contact with a suitable solvent in an absorber zone, there is provided the step of removing a rich solvent stream from said absorber zone and admixing it with the acetylene containing gas on its way to said acetylene absorber zone and cooling the admixture thus formed before said admixture enters said absorber zone which results in advantages set forth below.

Certain other features and objects of the invention are apparent upon careful study of this disclosure, the drawing and the appended claims.

Figure 2:
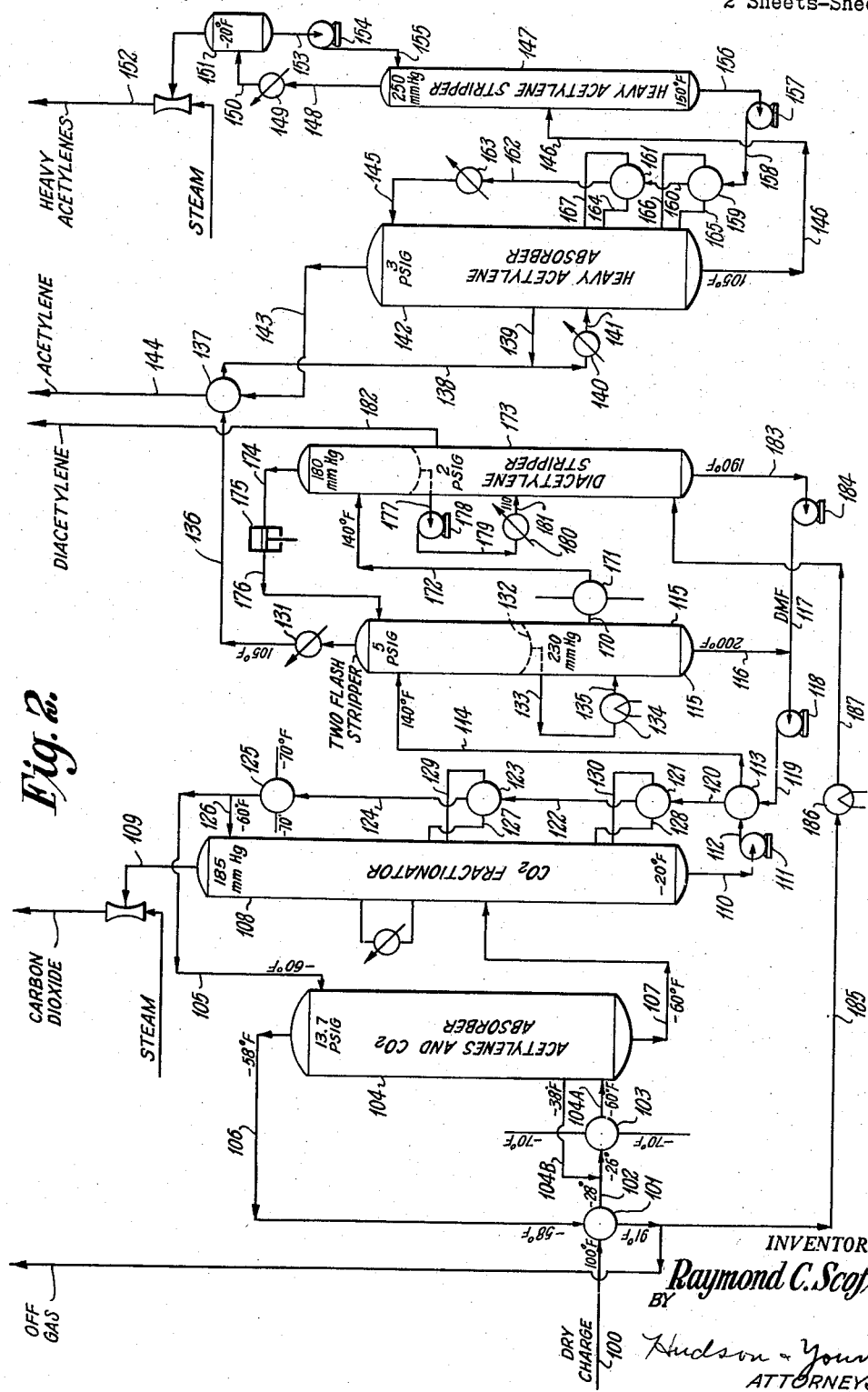

In the drawing in Figure 1, there is shown diagrammatically a specific embodiment of the invention employing dimethylformamide to absorb diacetylene from a charge gas containing also acetylene and other gases, following which acetylene is absorbed in dimethylformamide, freed of carbon dioxide and the acetylene recovered from the solvent. The embodiment illustrates the first stated modus operandi of the invention as well as the use of dimethylformamide at the low temperatures also according to the invention. In Figure 2, there is illustrated diagrammatically another specific embodiment of the invention in which the second stated modus operandi is applied to the recovery of acetylenes from the solvent before the diacetylene is removed from said solvent. Regarding the modus operandi of the figures of the drawing, it will be evident to one skilled in the art in possession of this disclosure that other solvents can be substituted in the modus operandi for the dimethylformamide.

Referring now to Figure 1 of the drawing. A charge gas containing diacetylene and acetylene and other gases as shown in Table II under "charge gas" is fed by way of conduit 2 through heat exchanger 3 and conduit 4 into diacetylene absorber 5 wherein diacetylene is absorbed from the charged gases by contact with dimethylformamide, introduced to absorber 5 by way of conduit 6. Employing a tower top temperature of about −46° F. and a solvent to feed mol ratio of approximately 1 to 30, and a pressure of approximately 5 pounds per square inch gauge, substantially all of the diacetylene is removed from the gases leaving absorber 5 by way of conduit 7 on their way to the acetylene absorber. Bottoms from diacetylene absorber 5 are passed by way of conduit 8, heat exchanger 9 and conduit 10 into diacetylene stripper 11 wherein diacetylene is stripped from the absorber medium which is returned for reuse by way of conduit 12, heat exchanger 9 and conduit 6 to absorber 5. Diacetylene is removed from the system by way of conduit 13. The gases passing to acetylene absorber 16 by way of conduit 7 are admixed just prior to a cooler 14 with a rich solvent stream withdrawn from the absorber 16 by way of conduit 15. The utilization of a rich solvent stream especially with a heat exchanger is a feature of this invention which provides an additional contact stage, in the present example, permitting absorption of 43 percent of the incoming acetylene in this contact stage when evaluated as a full equilibrium stage. The net result is a reduction in the temperature rise thru the absorber. This closer approach to isothermal conditions favors a lower solvent ratio and provides a resultant reduction in the refrigeration load. The admixture is passed from heat exchanger 14 by way of conduit 17 into acetylene absorber 16. The acetylene absorber is supplied thru conduit 18 with dimethyl formamide at a temperature approximately −60° F. The tower top is maintained at approximately this temperature and at a pressure of approximately 3.5 pounds per square inch gauge. In absorber 16 acetylene is removed from the gases and absorbed into dimethylformamide. A lean gas is taken overhead by way of conduit 19 and passed by way of heat exchanger 3 and conduit 20 to storage or utilization, say as a fuel gas. The composition of this gas is substantially as shown in the table under "fuel gas." At least a portion of the fuel gas can be passed from conduit 20 by way of conduit 21, heater 22 and conduit 23 into diacetylene stripper 11 to serve therein as a stripping gas. A portion of the liquid in acetylene absorber 16 can be removed by way of conduit 24 and circulated back to the absorber by way of cooler 25 and conduit 26 which in this example is maintained at approximately −60° F., to further remove heat from the absorber. Solvent containing acetylene is withdrawn from absorber 16 by way of conduit 27 and passed to carbon dioxide fractionator 28. This fractionator is operated at a pressure of approximately 100 mm. mercury and at a top temperature of approximately −60° F. The tower is cooled by way of coolers 29 and 30 which are supplied by conduits 31 and 32, respectively, with liquid from the fractionator which when cooled is returned thereto by way of conduits 33a and 33b. Carbon dioxide is removed by way of conduit 34 and solvent containing substantially all of the dissolved acetylenes is withdrawn by way of conduit 35, into pump 36 and passed by way of heat exchanger 37, conduit 38 and heater 39 through conduit 40 into 3-stage flash stripper 41 in which in three stages the acetylenes are stripped from the dimethylformamide solvent which is withdrawn from stripper 41 by way of conduit 42 and pumped by way of pump 43 and conduit 44 through heat exchanger 37, conduit 45, heat exchanger 46, conduit 47, heat exchanger 48 and conduit 49 through cooler 50 and thence through conduit 18 into acetylene absorber 16. A portion of the solvent in conduit 49 is passed by way of conduit 51 into carbon dioxide fractionator 28. In heat exchangers 37, 46 and 48 the solvent is precooled by heat exchange with cold rich solvent containing acetylene from fractionator 28. Thus, cold liquid is passed from fractionator 28 through conduit 52 through heat exchanger 48 and through conduit 53 back to the tower. Likewise, liquid taken from fractionator 28 is passed by way of conduit 54 through heat exchanger 46 by way of conduit 55 back to fractionator 28.

The flash stripper is maintained at a tower top temperature of approximately 170° F. and a bottom temperature of approximately 95° F. and in three stages the rich solvent is flashed first at about 5 pounds per square inch gauge and then about 250 mm. mercury and then about 65 mm. mercury. The 3-stage flashing is effected in compartments 56, 57 and 58. Gas from compartment 58 is pumped by way of conduit 59, compressor 60 and conduit 61 into compartment 57. In similar fashion, gas from compartment 57 is pumped by way of conduit 62, compressor 63 and conduit 64 into compartment 56. Gas is removed overhead from flash stripper 41 by way of cooler 65 and conduit 67 and passed by way of heat exchanger 68 and conduit 69 and final cooler 70 through conduit 71 into heavy acetylene absorber 72. The heavy acetylene absorber is maintained at a tower top temperature of approximately −20° F., and acetylene is taken overhead by way of conduit 73, heat exchanger 68 and conduit 74 and passed to gas holder 75. In heavy acetylene absorber 72 the acetylene is freed from the heavy acetylenes by contact with heptane at approximately −20° F., fed to the absorber by way of conduit 76. The heavy acetylenes are withdrawn by way of conduit 77 and passed to heavy acetylene stripper 78 from which heptane solvent is recovered by way of conduit 79 and pumped by way of pump 80, conduit 81, heat exchanger 82, conduit 83 and heat exchanger 84, and through conduit 85 through cooler 86 to conduit 76 and into absorber 72. Liquid from absorber 72 is passed by way of conduit 87, heat exchanger 84 and conduit 88 back to absorber 72. In similar fashion, liquid from absorber 72 is passed by way of conduit 89, heat exchanger 82 and conduit 90 back to absorber 72.

The temperatures at the various inlets and outlets of the heat exchangers are shown on the drawing for ready reading. In the heavy acetylene stripper which is maintained at a bottom temperature of approximately 150° F., heavy acetylenes freed from the heptane solvent are taken overhead through conduit 91, cooler 92 into reflux drum 93 which is maintained at approximately 120° F. Gaseous heavy acetylenes are withdrawn from the system by way of conduit 94 and liquid heavy acetylenes are pumped from drum 93 by way of conduit 95, pump 96 and conduit 97 into the top of stripper 78 as reflux therefor.

The compositions of the various gases described in connection with Figure 1 of the drawing are shown in the following table:

Table II

|  | Charge gas, m./s.d.[1] | Fuel gas, m./s.d.[1] | Carbon dioxide, m./s.d.[1] | Acetylene, m./s.d.[1] | Heavy acetylenes, m./s.d.[1] |
|---|---|---|---|---|---|
| $H_2$ | 23,724 | 23,723 | 1 | | |
| $N_2$ | 878 | 878 | | | |
| CO | 11,417 | 11,416 | | | |
| $CH_4$ | 2,220 | 2,213 | | 7 | |
| $C_2H_2$ | 3,532 | 70 | 1 | 3,461 | 1 |
| $CO_2$ | 1,767 | 1,616 | 150 | 1 | |
| $C_3H_4$ | 732 | 60 | | 1 | 671 |
| $C_4H_2$ | 137 | 137 | | | |
| $C_4H_4$ | 48 | 18 | 1 | | 29 |
| $C_7H_{10}$ | | | | | 4 |
|  | 44,455 | 40,131 | 161 | 3,463 | 705 |

[1] M./s.d.—mols per stream day.

In the foregoing operation, the off gas from the acetylene absorber is substantially free of acetylene while the rich solvent stream therefrom contains acetylene and higher boiling homologues such as methylacetylene and vinylacetylene.

Also, according to the invention, and as a feature thereof, the gaseous feed to the higher boiling acetylene absorber 72 is admixed with rich solvent as described in connection with the stream fed to acetylene absorber. Thus, rich solvent is taken by absorber 72 by way of conduit 98 and admixed with the heavy acetylenes in conduit 69 just prior to their entry into cooler 70. As described, this feature of the invention is highly advantageous here as it is in connection with absorber 16.

One skilled in the art in possession of this disclosure will understand that optimum operating conditions of temperature and pressure for any specific gas will depend to some extent upon the acetylene content of the feed. However, optimum temperatures in general will be somewhat higher in feeds richer in acetylene than for feeds leaner in acetylene. The acetylene absorber should be operated at as low a pressure level as will provide movement for the main acetylene stream and yet will furnish enough residual pressure for the utilization of the off gas as fuel when desired. The diacetylene absorber in general will be operated at a temperature below about 0° F., preferably below —20° F., and still more preferably in the range —20 to minus 70° F.

As noted, a study of this specification, the accompanying drawing and the claims will show that the invention provides dimethylformamide as a selective solvent for the recovery and purification of acetylene at a temperature substantially lower than the ordinary temperature which has been taught in the prior art. Further, the selective absorption of diacetylene at the low temperature and low solvent to feed ratio described is considered of especial value as a feature of the invention, more especially as it is combined with the remaining steps of selectively absorbing acetylene and higher boiling acetylenes in a subsequent absorption step at a low temperature and a higher solvent ratio. This advantageous sequence of steps is further of interest combined with the feature of the invention of flashing acetylene and higher boiling acetylenes from the solvent, following upon the removal of carbon dioxide by fractionation under reduced pressure, and selectively removing higher boiling acetylenes from the acetylene by absorption in a solvent such as normal heptane. Alternatively, advantages resulting in minimum equipment and minimum refrigeration are obtained when the separations between acetylene, heavier acetylenes, and diacetylenes are effected downstream of the acetylene absorber as will now be described in connection with Figure 2 of the drawing.

Referring now to Figure 2 of the drawing, a charge gas containing diacetylene, acetylenes and other gases as shown in Table III under "charge gas" is fed by way of conduit 100 through heat exchanger 101, conduit 102, heat exchanger 103 and conduit 104a into acetylenes and carbon dioxide absorber 104 wherein acetylenes and carbon dioxide are absorbed from the gases by contact with dimethylformamide introduced into absorber 104 by way of conduit 105. The gases are admixed with a portion of cold enriched solvent removed from absorber 104 by way of conduit 104b before the gases enter into heat exchanger 103. In said heat exchanger, the gases are further cooled so that they are at a temperature of about —60° F. upon entering absorber 104. The advantages of pre-cooling have been described. It will be noted that in this description not all of the temperatures and pressures of the drawing are necessarily described. Only those temperatures and pressures are here included which make for ready understanding of the embodiment and the reader is referred to the drawing for additional readily determinable conditions. Unabsorbed gases are taken overhead from absorber 104 by way of conduit 106. Rich solvent is removed from the bottom of the absorber by way of conduit 107 and fed to $CO_2$ fractionator 108 wherein an overhead stream is taken off containing substantially all of the carbon dioxide absorbed into the solvent. The carbon dioxide stream is taken overhead by way of conduit 109. Fractionator 108 is operated in this embodiment at about 185 mm. Hg, the tower top is supplied with dimethylformamide at —60° F. and the tower bottom is maintained at about —20° F. The bottoms stream 110 is removed from fractionator 108 and pumped by pump 111 through conduit 112, heat exchanger 113, and conduit 114 into two flash stripper 115. In heat exchanger 113, the $CO_2$ fractionator bottoms are raised to a temperature of approximately 140° F. It will be noted in connection with $CO_2$ fractionator 108 that there are provided heat exchangers for heat exchanging, dimethylformamide which is being pumped to the top of $CO_2$ fractionator with contents of $CO_2$ fractionator removed therefrom at several levels. Thus, dimethylformamide recovered at least in part from the foot of two flash stripper 115 at a temperature of approximately 200° F. is passed by conduit 116, conduit 117, pump 118, through conduit 119, heat exchanged with $CO_2$ fractionator bottoms in heat exchanger 113, then pumped through conduit 120, heat exchanger 121, conduit 122, heat exchanger 123, conduit 124, heat exchanger 125, and finally conduit 126 into the top of $CO_2$ fractionator 108. Heat exchanger 125 is supplied with refrigerant from any suitable source. In heat exchangers 123 and 121, the dimethylformamide being fed to a $CO_2$ fractionator 108 is heat exchanged with contents of $CO_2$ fractionator 108, removed therefrom by way of conduits 127 and 128, and returned thereto by conduits 129 and 130, respectively. Returning to two flash stripper 115, the bottoms from $CO_2$ fractionator which contain all of the acetylenes and diacetylene which have been absorbed are subjected to two flash stripping operations, the first in the top of the stripper being conducted at a pressure of about 5 pounds per square inch gauge, the tower top effluent being maintained at about 105° F. by means of heat exchanger 131, liquid collected in pan 132 being removed from the top section of the tower by way of conduit 133, heater 134, and conduit 135 and being introduced into the lower section of the tower maintained at about 230 mm. Hg and a bottom temperature at about 200° F. The top of the lower section of tower 115 is maintained at a temperature sufficiently high to insure the removal of substantially all diacetylene and any remaining heavy acetylenes from the solvent which, as described, is returned by way of conduits 116 and 117, etc., to $CO_2$ fractionator and to the acetylenes (and $CO_2$) absorber. The overhead from two flash stripper 115 is composed of acetylene and heavy acetylenes and is taken off by way of heat exchanger 131 and conduit 136 and passed by way of heat exchanger 137 and conduit 138 together with a precooling stream from conduit 139 into heat exchanger 140 and conduit 141 into heavy acetylene absorber 142 wherein at a pressure of about 3 pounds per square inch gauge and with a tower bottom of 105° F., acetylene is obtained as an overhead stream taken off by way of conduit 143, heat exchanger 137, and conduit 144 to storage. Heavy acetylene absorber, in this embodiment, is operated employing toluene as a solvent which is fed into the top portion thereof by way of conduit 145. Bottoms from absorber 142 are passed by way of conduit 146 into heavy acetylene stripper 147. In this stripper, heavy acetylenes are obtained at a pressure of approximately 250 mm. Hg and tower bottom temperature of about 150° F. taken overhead by way of conduit 148, heat exchanger 149, and conduit 150 into reflux drum 151. Heavy acetylenes are taken overhead from drum 151 by way of conduit 152. A portion of the heavy acetylenes is returned by way of conduit 153, pump 154, and conduit 155 to the top of heavy acetylene stripper 147 as reflux therefor. Substantially acetylene-free toluene solvent is removed as bottoms by way of conduit 156, pump 157, conduit 158, heat exchanger 159, conduit 160, heat exchanger 161, conduit 162, and heat exchanger 163 and passed through conduit 145 into the top of heavy acetylene absorber, as described. Portions of the contents of heavy acetylene absorber 142 are removed by way of conduits 165 and 164, passed through heat exchangers 159 and 161, respectively, and returned to absorber 142 by way of conduits 166 and 167, respectively. Returning now to two flash stripper 115 from the upper portion of the lower section thereof, a stream containing some acetylenes and diacetylene is removed by way of conduit 170, heat exchanger 171, and passed by conduit 172, into the upper section of diacetylene stripper 173. In the top of diacetylene stripper 173, which is maintained at approximately 180 mm. Hg and at about 140° F., there is taken overhead acetylenes by way of conduit 174, pump 175, and conduit 176 into the top of two flash stripper 115. Bottoms from the upper portion of diacetylene stripper 173 are removed by way of conduit 177, pump 178, conduit 179, cooler 180, and conduit 181 into the bottom portion of diacetylene stripper 173 which is operated at a pressure of about 2 pounds per square inch gauge and at a bottoms temperature of 190° F. Diacetylene is recovered from the solvent as overhead from the top of the bottom section of diacetylene stripper 173 and removed from said stripper by way of conduit 182. Solvent for reuse is removed as bottoms by way of conduit 183, pump 184, and conduit 117 and further handled as priorly described. Some of the dry gas or off gas taken overhead from absorber 104 by way of conduit 106 is passed by way of conduit 185, heater 186, and conduit 187 into the foot of stripper 173 as a lean stripping gas.

Compositions of the principal gas streams at various points in the unit are summarized in Table III.

*Table III*

|  | Off Gas, m./s.d.[1] | Carbon Dioxide, m./s.d.[1] | Diacetylene, m./s.d.[1] | Acetylene, m./s.d.[1] | Heavy Acetylenes, m./s.d.[1] | Charge Gas, m./s.d.[1] |
| --- | --- | --- | --- | --- | --- | --- |
| $H_2$ | 19,768 | 2 | 3,954 |  |  | 23,724 |
| $N_2$ | 729 |  | 149 |  |  | 878 |
| CO | 9,512 | 2 | 1,902 |  |  | 11,417 |
| $CO_2$ | 1,271 | 240 | 255 | 1 |  | 1,767 |
| $CH_4$ | 1,842 | 10 | 368 |  |  | 2,220 |
| $C_2H_2$ | 30 | 1 | 60 | 3,440 | 1 | 3,532 |
| $C_3H_4$ | 50 |  | 40 | 1 | 641 | 732 |
| $C_4H_2$ |  |  | 110 |  | 27 | 137 |
| $C_4H_4$ |  | 1 | 8 |  | 40 | 48 |
|  | 33,202 | 256 | 6,846 | 3,442 | 709 | 44,455 |

[1] M./s.d.—mols per stream day.

A comparison of the composition of the "fuel gas" and "off gas" acetylene contents in columns 2 and 1 of Tables II and III, respectively, indicates that the modus operandi last described results in a more complete acetylene recovery. Thus, 70 mols per stream day of $C_2H_2$ are left in the "fuel gas" of Table II while only 30 mols of acetylene is left in the "off gas" of Table III.

Also, to be especially noted is the specific and advantageous character of the modus operandi of Figure 2, just described, in respect of the provision, positioning and operation of the sequence of steps which begins with the $CO_2$-fractionator bottoms 110. It is here that diacetylene separation can be said to begin. The problem is to separate and recover the diacetylene with a minimum loss of acetylene ($C_2H_2$) in the diacetylene stream and with a minimum loss of dimethylformamide in the stripping operation. Flashing the rich solvent stream in the upper zone (5 p.s.i.g.) of two flash stripper 115 removes a major portion of the acetylene and heavier acetylenes (but not diacetylene), leaving the diacetylene and some acetylene and heavier acetylenes in the solvent stream removed via line 133. In the lower zone (230 mm. Hg) all of the dissolved hydrocarbons and some of the solvent are flashed off, thereby leaving a major portion of the dimethylformamide, of the order of 96 percent, unvaporized and substantially free of any acetylenes. This major portion of the solvent stream is then returned to absorber 104 via lines 116, 119, etc. The vaporized solvent and diacetylene are condensed in 171 so that in the 180 mm. Hg zone of the diacetylene stripper, these components are separated from the uncondensed acetylenes and the latter are returned via lines 174 and 176 to the overhead of the 5 p.s.i.g. stripper zone. This results in the recovery of acetylenes which might otherwise be lost in the diacetylene product stream.

Returning now to the unvaporized solvent plus diacetylene stream in line 177, this material, which contains substantially all of the diacetylene but only a small percentage (of the order of 4 percent) of the total dimethylformamide, is stripped in 173 with gas from 187 so that the diacetylene is removed from the solvent and taken off via line 182. The foregoing procedure has certain advantages over the alternative of stripping the entire solvent stream 133 in a diacetylene stripper corresponding to 173 without the intervening flash steps. This alternative procedure would result in excessive losses of dimethylformamide, because it would entail stripping the entire solvent stream instead of only about 4 percent thereof, and would require a correspondingly larger amount of stripping gas. Another disadvantage of stripping without the intervening flash steps is that the acetylene remaining in stream 133 would be lost in the diacetylene stream. This loss would be of the order of 20 percent of the acetylene.

Thus, at the particular place in Figure 2 at which the diacetylene is removed, acetylene and solvent, as well as heat requirements, are saved.

Reasonable variation and modification are possible within the scope of the foregoing disclosure, drawings and appended claims to the invention, the essence of which is (1) that an acetylene is advantageously removed from a gas containing same by contacting said gas with dimethylformamide at a temperature below 0° F., and preferably well below 0° F., for example, below about −20° F., preferably in the range −20° F. to −70° F.; (2) that sequences of steps in several modus operandi resulting in advantageous utilization of refrigeration capacity have been set forth as described; and (3) that there has been provided a pre-mixing of a rich solvent stream with gases about to enter an acetylene absorber, cooling the mixture thus obtained before it enters the said absorber.

I claim:
1. The removal of acetylenes from a gas stream containing acetylene, heavy acetylenes, diacetylene and carbon dioxide which comprises contacting said gas stream with dimethylformamide solvent to remove substantially only diacetylene from said stream, stripping diacetylene from said solvent and removing diacetylene as a separate stream from the system, returning the stripped solvent to said contacting for reuse, passing the resulting substantially diacetylene free gas into contact with dimethylformamide solvent to remove substantially all the acetylenes therefrom, thus obtaining an acetylene rich solvent stream, fractionating said acetylene rich solvent stream to remove carbon dioxide therefrom, flashing the resultant rich stream to recover an acetylene and heavy acetylenes containing gas stream and solvent, returning the solvent for reuse in the system, contacting the acetylene and heavy acetylenes containing gas stream with heptane to separate acetylene from a solvent rich in heavy acetylenes and recovering, finally, the heavy acetylenes from the said solvent.

2. The removal and recovery of acetylene and heavy acetylenes from a gas stream containing them together with other gases comprising diacetylene and carbon dioxide which comprises contacting the gases at a temperature below 0° F. with a solvent in a single absorption step to absorb therefrom acetylene, heavy acetylenes, diacetylene, and some carbon dioxide, leaving a large proportion of the carbon dioxide unabsorbed, subjecting enriched solvent thus obtained to fractionation to remove therefrom carbon dioxide, then subjecting the substantially carbon dioxide-free enriched solvent to a series of flashing steps in which acetylene and heavy acetylenes are removed as a separate stream from said solvent leaving diacetylene in said solvent, separating acetylene and heavy acetylenes to recover the same as separate streams, and finally recovering diacetylene from said solvent.

3. An operation according to claim 2 wherein dimethylformamide is employed as the solvent to absorb acetylene, heavy acetylenes, diacetylene, and carbon dioxide and wherein toluene is employed to separate heavy acetylenes and acetylene by steps comprising absorbing heavy acetylenes into said toluene, thus obtaining acetylene substantially free of heavy acetylenes and then recovering the heavy acetylenes and substantially acetylene-free toluene solvent by a stripping operation.

4. A method according to claim 2 wherein the substantially carbon dioxide free enriched solvent is flashed in a first flash zone to remove therefrom a major portion of the acetylene and heavy acetylenes, but not diacetylene, then in a second flash zone flashing the bottoms from said first flash zone to remove therefrom substantially completely any residual acetylene, diacetylene and heavy acetylenes to form a stream containing said removed acetylenes and some vaporized solvent, withdrawing substantially pure liquid solvent from said second flash zone, condensing diacetylene and solvent in said stream, passing said stream into a third zone and therein separating acetylenes and heavy acetylenes from the condensed diacetylene and solvent, passing the liquid bottoms from said third zone to a stripper zone wherein diacetylene is stripped from said solvent, and passing the acetylene and heavy acetylenes from said first flash zone as herein stated to an acetylene recovery zone.

5. A method according to claim 4 wherein the acetylene and heavy acetylenes recovered from said first flash zone and the acetylene and heavy acetylenes recovered from said third zone are passed to a heavy acetylenes separation system from which there are recovered as separate streams, heavy acetylenes and acetylene.

6. A method for separating acetylene, heavy acetylenes and diacetylene from a solvent containing the same which comprises subjecting said solvent to a flashing in a first flash zone to remove therefrom a major portion of acetylene and heavy acetylenes, but not diacetylene, passing said acetylene and heavy acetylenes to an acetylene and heavy acetylenes separation zone, passing the bottoms from first flash zone to a second flash zone therein flashing from said solvent substantially completely all of the dissolved hydrocarbons together with some of the solvent, thereby obtaining as bottoms, which can be reused, a major portion of said solvent in substantially stripped condition, condensing diacetylene and solvent in the overhead from said second flash zone, passing the said overhead to a third zone, in said third zone separating acetylene and heavy acetylenes from solvent and diacetylene, passing the separated acetylene and heavy acetylenes to said acetylene and heavy acetylenes separation zone, then stripping the bottoms from said third zone to recover separately therefrom diacetylene and solvent, which can be reused.

7. A method according to claim 6 wherein the solvent is dimethylformamide.

8. A method according to claim 6 wherein the acetylene is separated from heavy acetylenes by contacting the heavy acetylenes and acetylene containing stream with toluene to absorb heavy acetylenes therein, thus obtaining acetylene substantially free of heavy acetylenes and then separately recovering the heavy acetylenes and substantially hydrocarbon free solvent by a stripping operation.

9. A method for the removal of acetylenes from a gas stream containing the same and carbon dioxide, said method comprising contacting said gas stream with dimethylformamide at a temperature below 0° F. in an absorption zone, removing acetylenes-rich dimethylformamide solvent from said absorption zone, desorbing carbon dioxide from said acetylenes-rich dimethylformamide solvent, fractionating the resulting desorbed acetylenes-rich dimethylformamide solvent to remove said acetylenes therefrom, contacting said acetylenes with heptane solvent in an absorption zone, removing acetylene from said last absorption zone as product of the process, removing heavy acetylenes-rich heptane solvent from said last absorption zone, and separating heavy acetylene from said heavy acetylenes-rich heptane solvent as product of the process.

10. A method for the removal of acetylene from a gas stream containing the same, carbon dioxide, and heavy acetylenes in minor amounts, said method comprising contacting said gas stream with dimethylformamide at a temperature below 0° F. in an absorption zone, removing dimethylformamide solvent having said acetylene, carbon dioxide and heavy acetylenes absorbed therein from said absorption zone, desorbing carbon dioxide from said last-removed dimethylformamide solvent, fractionating the resulting desorbed dimethylformamide solvent to remove said acetylene and said heavy acetylenes as a gaseous mixture, contacting said gaseous mixture of acetylene and heavy acetylenes with heptane in an absorption zone, and removing acetylene from said last absorption zone and recovering said acetylene as product of the process.

11. The method for the recovery of acetylenes from a gas stream containing the same together with carbon dioxide which comprises contacting said gas stream with a dimethylformamide solvent in a single absorption zone at a temperature below 0° F. to absorb therefrom said acetylenes and carbon dioxide, desorbing carbon dioxide from the enriched dimethylformamide solvent thus obtained, fractionating the substantially carbon dioxide-free enriched solvent obtained in a fractionating zone to remove substantially all the remaining absorbed components from said dimethylformamide solvent as a gaseous stream, contacting said gaseous stream obtained from said fractionating zone with a heptane solvent in an absorption zone to absorb substantially all of the hydrocarbon components other than acetylene in said heptane solvent and to form acetylene as a substantially pure stream, recovering said acetylene as product of the process, desorbing the enriched heptane solvent obtained from said last absorption zone to separate the remaining acetylenes therefrom, and recovering said remaining acetylenes as product of the process.

12. A method for the recovery of acetylene from a first gas stream containing the same in minor quantities and also containing heavy acetylenes and carbon dioxide, said method comprising contacting said first gas stream with dimethylformamide solvent at a temperature below 0° F. to obtain an enriched solvent containing substantially all of said acetylene and said heavy acetylenes originally contained in said first gas stream and also containing carbon dioxide, passing enriched solvent as the sole feed containing acetylene to a desorption zone and desorbing therein carbon dioxide from said enriched solvent to form a second stream containing desorbed carbon dioxide, removing substantially all of the remaining absorbed components from said dimethylformamide solvent as a third gas stream, and contacting said third gas stream with a heptane solvent and thereby absorbing in said solvent substantially all of the hydrocarbon components other than acetylene and thereby forming a fourth gas stream containing substantially all of the acetylene in said third gas stream and an enriched solvent containing substantially all of the heavier acetylenes in said third gas stream, said fourth gas stream being a product of the process.

13. The method for the recovery of acetylene and heavy acetylenes from a gas stream containing the same and carbon dioxide which comprises contacting said gas stream with a dimethylformamide solvent in a first absorption zone at a temperature below 0° F. and low pressure, thereby obtaining an off-gas stream containing a large proportion of the carbon dioxide and a rich solvent stream, removing acetylene-rich and heavy acetylenes-rich dimethylformamide solvent containing some absorbed carbon dioxide from said first absorption zone, flowing said rich solvent as the sole feed containing acetylene to a desorption zone and therein desorbing said rich dimethylformamide solvent to remove said carbon dioxide therefrom, fractionating the resulting desorbed acetylene-rich and heavy acetylenes-rich dimethylformamide solvent to remove said acetylene and heavy acetylenes therefrom, recovering desorbed lean solvent and returning said lean solvent to said first absorption zone, contacting said acetylenes removed from said fractionating step with a hydrocarbon solvent in a second absorption zone to absorb acetylenes other than acetylene therefrom, leaving acetylene unabsorbed, recovering the unabsorbed acetylene from said second absorption zone as product of the process, removing hydrocarbon solvent having acetylenes other than acetylene absorbed therein from said second absorption zone and recovering said acetylenes other than acetylene therefrom as product of the process.

14. The method for the recovery of acetylene from a gas stream containing the same together with other hydrocarbon gases and carbon dioxide which comprises contacting said gas stream with dimethylformamide solvent in an absorption zone at a temperature of about −20° F. and pressure near atmospheric, removing acetylene-rich dimethylformamide solvent containing some carbon dioxide from said absorption zone, desorbing said carbon dioxide therefrom, fractionating the resulting desorbed acetylene-rich dimethylformamide solvent to remove said acetylene and said hydrocarbon gases from said dimethylformamide solvent as a gaseous stream, removing resulting lean dimethylformamide solvent and returning said recovered dimethylformamide solvent to said absorption zone, contacting said gaseous stream obtained from said fractionation step with a heptane solvent in an absorption zone to absorb said hydrocarbon gases therein, and removing and recovering said acetylene from said last absorption zone as product of the process.

15. A method for the recovery of acetylene from a first gas stream containing the same and also containing heavier acetylenes and carbon dioxide, said method comprising contacting said first gas stream with dimethylformamide solvent at a temperature below 0° F. to obtain an enriched solvent containing substantially all of said acetylene and said heavier acetylenes originally contained in said first gas stream and also containing carbon dioxide, passing enriched solvent to a desorption zone and desorbing therein carbon dioxide from said enriched solvent to form a second stream containing desorbed carbon dioxide, removing substantially all of the remaining absorbed components from said dimethylformamide solvent as a third gas stream, and contacting said third gas stream with a heptane solvent and thereby absorbing in said solvent substantially all of the hydrocarbon components other than acetylene and thereby forming a fourth gas stream containing substantially all of the acetylene in said third gas stream and an enriched solvent containing substantially all of the heavier acetylenes in said third gas stream, said fourth gas stream being a product of the process.

References Cited in the file of this patent

UNITED STATES PATENTS

| | | |
|---|---|---|
| 1,938,991 | Wulff | Dec. 12, 1933 |
| 1,989,273 | Grimme et al. | Jan. 29, 1935 |
| 2,469,724 | Gross | May 10, 1949 |
| 2,486,543 | Wenzke | Nov. 1, 1949 |
| 2,587,689 | Box | Mar. 4, 1952 |
| 2,596,785 | Nelly et al. | May 13, 1952 |
| 2,664,997 | Eck | June 5, 1954 |
| 2,690,814 | Reid | Oct. 5, 1954 |
| 2,714,940 | Milligan | Aug. 9, 1955 |
| 2,715,947 | Alexander | Aug. 23, 1955 |
| 2,773,560 | Kohl et al. | Dec. 11, 1956 |

FOREIGN PATENTS

| | | |
|---|---|---|
| 29,750 | Great Britain | of 1896 |
| 570,648 | Great Britain | July 17, 1945 |

OTHER REFERENCES

"DMF-Acetylene Recovery Solvent" by Howard, Schoch and Mayforth, Petroleum Refiner, January 1954, pages 143 to 146.

"Organic Chemistry" by G. A. Hill and L. Kelley, The Blaskiston Co., 1943, page 305.

"Wulff Process," Petroleum Refiner, vol. 32, No. 11, November 1953, pages 118–120.

"Wulff Process For Acetylene From Hydrocarbons," Petroleum Processing, vol. 8, March 1953, pages 377–383.

"Acetylene From Hydrocarbon Feed," Petroleum Processing, vol. 8, September 1953, page 1355.

"Complexes of Boron Trifluoride With Amides," by E. L. Muetterties and E. G. Rochow, J. Am. Chem. Soc.; 75, 490 (1953).